United States Patent Office 2,789,969
Patented Apr. 23, 1957

2,789,969

POLYCARBONATES FROM 4,4'-BIS-(HYDROXYMETHYL)-BIPHENYL-BIS-(ALKYL OR ARYL CARBONATES)

Delbert D. Reynolds and Kenneth R. Dunham, Rochester, N. Y., assignors to Eastman Kodak Company, Rochester, N. Y., a corporation of New Jersey No Drawing. Application December 8, 1953, Serial No. 397,036

17 Claims. (Cl. 260—77.5)

This invention relates to highly polymeric linear polycarbonates prepared by the self-condensation in the presence of an ester-interchange catalyst of 4,4'-bis-(hydroxymethyl)-biphenyl-bis-(alkyl or aryl carbonate). These starting materials are hereinafter referred to as bis-(carbonate) monomers. This invention also includes polycarbonates prepared by condensing mixtures of these bis-(carbonate) monomers. Furthermore, this invention concerns the processes involved in preparing the monomers and polymers.

It is an object of this invention to provide unexpectedly and unusually superior highly polymeric linear polycarbonates which are valuable in preparing fibers, film, etc. as described herein. It is a further object of this invention to provide 4,4'-bis-(hydroxymethyl)-biphenyl-bis-(alkyl or aryl carbonates) as monomeric starting materials for the preparation of the polycarbonates. An additional object of this invention resides in providing a process for converting the bis-(carbonate) monomeric starting materials into the polycarbonates. Other objects will become apparent hereinafter.

Linear polycarbonates prepared by the condensation of p-xylylene glycol and m-xylylene glycol with an alkyl carbonate had been described by Carothers and his followers in the prior patented art as well as in Carothers' collected papers. Practically no subsequent work appears to have been performed in connection with the preparation of such linear polycarbonates. The materials prepared as described in Carothers' collected papers were of relatively low molecular weight and do not constitute highly polymeric linear crystalline polycarbonates which have high melting points, high intrinsic viscosities and which are useful in the formation of photographic film, fibers, threads, textile fabrics, electrical insulating materials, etc. The product obtained by Carothers is said to be a powder melting at less than 185° C. and having a molecular weight of not much more than 1,000. The products of the instant invention are highly polymeric polycarbonates which possess an unexpectedly high intrinsic viscosity and high melting points such that they can be extruded to form films and the like which can be mechanically worked and heat-set to form molecularly oriented structures. According to Carothers, all of the polycarbonates described were prepared by alcoholysis between a glycol and ethyl carbonate in the presence of an alkaline catalyst, such as sodium, whereby vapors of an alcohol were driven off by heating.

One of Carothers' followers suggests that a trace of an aliphatic dibasic acid can be introduced into the reactants in Carothers' process whereby "super polycarbonates" can be produced by heat under a vacuum. When the processes described in the prior art are employed, the intrinsic viscosities of the products do not approach those obtainable in accordance with the instant invention.

The prior art does not describe any completely satisfactory procedure which will produce linear highly polymeric polycarbonates having melting points above about 250° C. and having high intrinsic viscosities. The process of the instant invention represents a great improvement over that described in the prior art since it provides a simple, direct, easily reproducible process, and the polycarbonates obtainable have unexpectedly superior physical and chemical characteristics.

There are other regards in which the polycarbonates of this invention are superior to those described in the prior art. These include the percentage of elongation, tenacity, elastic recovery, work recovery, stress relaxation, tensile strength, resistance of films to tearing and to repeated folding, modulus of elasticity, electrical properties, etc. This invention is limited in scope to those particular bis-(carbonate) monomers disclosed since experiments demonstrate that only such compounds and a few others described in copending applications can be employed to produce highly polymeric linear polycarbonates of the type with which this invention is concerned. Particular reference is made to the application filed on even date herewith, Ser. No. 399,822, wherein the bis-(carbonate) monomer is p-xylylene glycol-bis(ethyl carbonate) or related compounds. The polycarbonates of the instant application are surprisingly superior to those of Serial No. 399,822 especially in regard to the melting points and intrinsic viscosities of the polymers.

The process of this invention for producing the novel polycarbonates comprises (A) self-condensing a bis-(carbonate) monomer having the following formula:

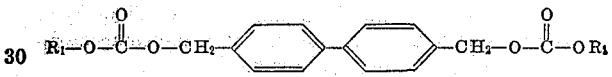

where $R_1$ and $R_2$ each represents a radical selected from the group consisting of lower alkyl radicals containing from 1 to 4 carbon atoms and aryl radicals of the benzene series containing from 6 to 8 carbon atoms, (B) in the presence of an ester-interchange catalyst containing titanium as an essential metallic element, which catalyst can be selected from the group consisting of

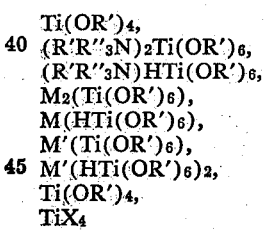

$Ti(OR')_4$,
$(R'R''_3N)_2Ti(OR')_6$,
$(R'R''_3N)HTi(OR')_6$,
$M_2(Ti(OR')_6)$,
$M(HTi(OR')_6)$,
$M'(Ti(OR')_6)$,
$M'(HTi(OR')_6)_2$,
$Ti(OR')_4$,
$TiX_4$ and ether complexes of $TiX_4$ wherein the ether complexes are derived by reacting $TiX_4$ with an ether selected from the group consisting of aliphatic and alicyclic ethers containing from 2 to 12 carbon atoms and wherein R' represents an alkyl radical containing from 1 to 8 carbon atoms, R" represents a R' radical or an aryl radical of the benzene series containing from 6 to 9 carbon atoms, M represents an alkali metal, M' represents an alkaline earth metal and X represents a halogen atom, (C) at an elevated temperature, (D) the condensation being conducted in an inert atmosphere and (E) the latter part of the condensation being conducted at a very low pressure.

It can readily be seen from the description of the process that there is no problem involved in adjusting the ratio of carbonate constituent to 4,4'-bis-(hydroxymethyl)-biphenyl constituent in the reaction vessel since the polycarbonates are produced according to this invention by the self-condensation of only one starting material. This establishes the composition of the polycarbonate produced since there could be no variation in the proportion of carbonate and glycol constituents. Moreover, the nature of this process makes it admirably suited to conducting the process on a continuous basis since no problems are involved in maintaining critical proportions of reactants.

Examples of the starting materials, i. e., the bis-(carbonate) monomers which can be used in the process of this invention include 4,4'-bis-(hydroxymethyl)-biphenyl-bis-(ethyl carbonate), 4,4'-bis-(hydroxymethyl)-biphenyl-bis-(p-tolyl carbonate), 4,4'-bis-(hydroxymethyl)-biphenyl-bis-phenyl carbonate), 4,4'-bis-(hydroxymethyl)-biphenyl-bis-(n-butyl carbonate), 4,4'-bis-(hydroxymethyl)-biphenyl-bis-(isopropyl carbonate), 4,4'-bis-(hydroxymethyl)-biphenyl-bis-(methyl carbonate), etc.

In carrying out the process of this invention, the ester-interchange catalysts which can be employed as condensing agents are extremely limited as indicated. It would perhaps appear that any of the well-recognized ester-interchange catalysts would be operative. However, this has not been found to be the case. Very unexpectedly, the applicants discovered that only compounds of titanium can be satisfactorily employed as catalysts to produce the polyesters of this invention. Other compounds which are well recognized ester-interchange catalysts promote the degradation of the starting material with the evolution of carbon dioxide. This aspect of the invention is discussed in greater detail hereinbelow.

The titanium catalysts described above can be advantageously employed in an amount of from 0.005% to 0.2% by weight based on the weight of the bis-(carbonate) monomer being condensed. Higher or lower proportions can also be employed.

The temperature at which the condensation is conducted depends upon whether the process is conducted in the solid phase or in the liquid phase. When either type of process is used, the temperature can be advantageously increased during the course of the condensation. Advantageously, the reaction can be considered as being conducted in two stages. The temperature to which the condensation reaction mixture is initially raised at the beginning of stage I is advantageously in excess of 200° C. Lower temperatures can also be employed although it is generally advantageous to use an initial temperature of at least about 200° C. Although it is convenient to consider the condensation process as being conducted in two separate stages, the actual condensation itself continues smoothly from stage I into stage II. The principle of distinction between the so called two stages lies in the fact that during stage II, the pressure of the adjacent atmosphere under which the condensation is performed is greatly reduced. Although the temperature can remain the same for both the first and the second stage, it is advantageous to employ a somewhat higher temperature at about the same time the pressure is reduced especially when the liquid phase process is being employed. The temperatures used during the latter part of stage II can advantageously be at least 250° or higher; the maximum temperature which can be employed is determined by the tendency of the polycarbonate to decompose at extremely high temperatures. As a practical matter, it is most advantageous to limit the maximum temperature to not much above about 250° C. When a solid phase process is employed, the maximum temperature can be restricted to much lower temperatures, although the time required to accomplish the production of desirable linear polymeric polycarbonates may be increased accordingly.

The reduced pressure which is employed during stage II of the condensation is advantageously less than about 15 mm. of Hg of pressure. Most advantageously, the pressure is about 0.5 mm. of Hg of pressure. Generally speaking, pressures are employed which are the lowest pressures obtainable by the employment of an efficient high-vacuum mechanical pump. Such pressures are generally in the range of less than 1 mm. of Hg pressure.

The time required for each of the two stages can advantageously be from about one-half to 4 or 5 hours. Longer or shorter periods of time can also be employed.

The inert atmospheres which can be advantageously employed in the course of the condensation reaction include atmospheres of nitrogen, hydrogen, helium, carbon dioxide, etc.

It is generally advantageous to stir the condensation reaction mixture in order to maintain a reasonably even distribution of temperature throughout the reaction mixture and to otherwise facilitate the condensation. However, this is not essential especially when small quantities of bis-(carbonate) monomers are being condensed. During the course of the reaction, an alkyl ester or an aryl ester of carbonic acid will be evolved as a gas, as indicated hereinabove. Stirring facilitates the removal of this material in its gaseous form. Either as an aid to the stirring operation or in lieu thereof, the inert gas can be advantageously bubbled through the reaction mixture whereby the removal of the carbonic acid ester is also facilitated.

The various conditions described somewhat generally hereinabove in regard to the process of this invention can obviously be altered to suit the particular starting material being condensed and other additions which are specific to the reaction being accomplished under any particular set of circumstances. These variations are set forth to some extent in the examples below.

The products of this invention are linear highly polymeric crystalline polycarbonates having a melting point of above about 250° C., high intrinsic viscosities and containing the following repeating units

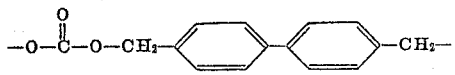

wherein the units are connected by ester linkages. In this specification all intrinsic viscosities are measured by standard procedures employing solutions in 60% phenol-40% sym. tetrachlorethane. The melting points of the polycarbonates described in the examples hereinbelow were all at least 250° C. and were generally about 260° C.

The bis-(carbonate) monomers of this invention have been found to possess certain qualities that can be improved upon by the formation of interpolycarbonates as described in our copending applications, Serial Numbers 407,804, 407,805 and 407,806, filed on February 2, 1954. Besides employing bis-(carbonate) monomers in the formation of interpolycarbonates, the polycarbonates of this invention can be mechanically admixed with other polycarbonates to form mixed polymers possessing average properties derived from the various components of the mixture. It is similarly obvious that both the unmodified polycarbonates and interpolycarbonates can be suitably blended or mixed with other polycarbonates, polyesters, polyurethanes, polyamides, polystyrenes, polyethylene, etc. insofar as the polycarbonates of this invention are compatible with such high polymers. The products which can be produced include waxes, fibers, molded articles, extrusion products, coating materials, etc.

The polycarbonates of this invention can be prepared by various continuous processes employing many types of apparatus known to be useful in conducting various related continuous processes as described in the prior art, for example, the method set forth in U. S. 2,647,885 can be suitably adapted. For another example, a process is described in copending application Ser. No. 399,822 filed on even date herewith.

The bis-(carbonate) monomers employed in accordance with this invention can be prepared by condensing an alkyl or an aryl chlorocarbonate with 4,4'-bis-(hydroxymethyl)-biphenyl. Although it is advantageous to carry out this condensation in a tertiary amine such as pyridine, other acid-binding agents can also be employed. Advantageously, the reaction mixture can be cooled to prevent excessive increase in temperature. Advantageously, more than two mole proportions of alkyl or aryl chlorocarbonate or bromocarbonate are employed for each mole proportion of 4,4'-bis-(hydroxymethyl)-biphenyl. Upon suitable purification, the reaction mixture obtained gives a good yield of 4,4'-bis-(hydroxymethyl)-biphenyl-bis-(alkyl or aryl carbonate). Various modifications of this process can obviously be employed to produce the bis-(carbonate) monomer starting material.

The following example will serve to further illustrate how these bis-(carbonate) monomers can be prepared:

PREPARATION OF 4,4'-BIS (HYDROXYMETHYL) BIPHENYL-BIS (ETHYL CARBONATE)

A. *4,4'bis (acetoxymethyl) biphenyl.*—A mixture of 3400 g. (10 moles) of 4,4'-bis (bromomethyl) biphenyl, 3400 g. of sodium acetate and 8500 ml. of glacial acetic acid was placed in a 12 liter flask equipped with a reflux condenser. The mixture was refluxed for 7 hours and then cooled to 25° C. It was then poured into water and the solid separated by filtration. This product was washed with water and dried. After one recrystallization from isopropyl ether, it melted at 87–89° C. Yield (1st crop) 1990 g. A second crop was obtained by concentration of the filtrate from the recrystallization. Yield (2nd crop), 400 g. M. P. 85–87° C. Total yield, 80%.

B. *4,4'bis (hydroxymethyl) biphenyl.*—A mixture of 2390 g. of 4,4'-bis (acetoxymethyl) and 6 l. methanol were placed in a 12 liter flask and 120 g. dry HCl added. This reaction mixture was then refluxed for 6 hours. After cooling, the solid product which had formed was separated by filtration and dried at 50° C.; M. P. 188–191° C. After one recrystallization from ethanol, it melted at 192.5–193.5° C. Yield, 1470 g.

C. *4,4'-bis (hydroxymethyl) biphenyl-bis (ethyl carbonate).*—4,4'-bis(hydroxymethyl) biphenyl (1070 g.) (5 moles) and pyridine (3 liters) were placed in a 12 liter flask equipped with a mechanical stirrer, a thermometer and a dropping funnel. The stirred solution was cooled to 15° C. and 1194 g. ethyl chlorocarbonate (10% excess) was added at such a rate that the reaction temperature was kept at 20–25° C. This addition required one hour. The reaction mixture was allowed to stand overnight and then stirred into cold water. The product which separated was filtered off, washed with water and dried at 50° C. After one crystallization from ligroin, it melted at 58.5–59.5° C. Yield 96%.

D. *4,4'bis(hydroxymethyl)-biphenyl-bis-(phenyl carbonate).*—The procedure described in Example C was repeated except that a 10% excess of phenyl chlorocarbonate was employed in lieu of the ethyl chlorocarbonate.

E. *4,4' - bis(hydroxymethyl) - biphenyl - bis - (pentyl carbonate).*—The procedure described in Example C was repeated except that a 10% excess of pentyl bromocarbonate was employed.

It is believed readily apparent that other corresponding bis-carbonate monomers can be prepared employing alkyl or aryl carbonates wherein the alkyl radicals contain from 1 to 8 carbon atoms and the aryl radicals are members of the benzene series containing from 6 to 8 carbon atoms.

The bis-carbonate monomers, prepared as described above, can be employed in accordance with the following examples which serve to further illustrate this invention as regards the polycarbonates and their preparation.

*Example 1.—Polycarbonate employing titanium butoxide as catalyst*

A quantity of ten grams of 4,4'-bis-(hydroxymethyl)-biphenyl-bis-(ethyl carbonate) was prepared as described in Example C, and a couple of drops of titanium butoxide was added. This mixture was heated in an atmosphere of nitrogen at 250° C. for one hour. The resulting product was stirred and heated at 270° C. under reduced pressure in vacuum for an additional 45 minutes. The resulting viscous clear dope crystallized rapidly to give a white porcelain-like product which was insoluble in a 60:40 phenol:sym. tetrachlorethane mixture. This polymer melted at 260° C.

*Example 2.—Polycarbonate employing sodium hydrogen titanium butoxide as catalyst*

Two hundred grams of 4,4'-bis-(hydroxymethyl)-biphenyl-bis-(ethyl carbonate) was melted, and 0.2 g. of sodium hydrogen titanium butoxide was added. The reaction mixture was heated under an atmosphere of nitrogen for an hour and forty minutes in an oil bath at 200–240° C. During this period the ethyl carbonate which formed was distilled from the reaction flask (stage I). The reaction mass was then stirred at 0.5 mm. pressure for three hours and twenty minutes while being heated in a 265° C. oil bath. Upon cooling, a white crystalline porcelain-like product was obtained.

The catalysts employed in accordance with the instant invention result in the production of polycarbonates which have the advantageous properties described hereinabove whereas many of the other better known ester-interchange catalysts result in the production of polycarbonates which have a low molecular weight and are wax-like products of inferior properties. Such inferior products result when sodium is employed as the catalyst, as well as when other presumably efficient ester-interchange catalysts are employed. Examples 3, 4 and 5 below demonstrate that decomposition takes place. It appears that the bis-(carbonate) monomer employed as a starting material undergoes a series of reactions in the presence of most ester-interchange catalysts which reactions can be graphically portrayed as follows beginning with the following starting material:

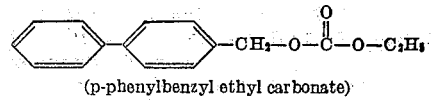

(p-phenylbenzyl ethyl carbonate)

This starting material is analogous to the structure in 4,4'-bis-(hydroxymethyl)-biphenyl-bis-(ethyl carbonate). The decomposition of this starting material as catalyzed by most ester-interchange catalysts gives decomposition products as follows:

Step A
⟶

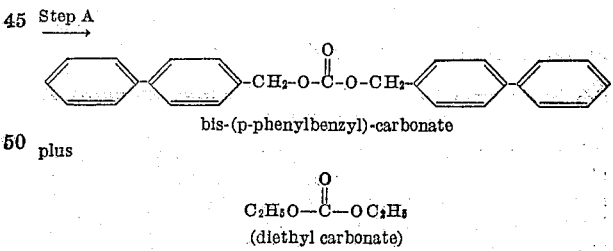

bis-(p-phenylbenzyl)-carbonate plus (diethyl carbonate)

The bis-(p-phenylbenzyl) carbonate then decomposes as follows:

Step B
⟶

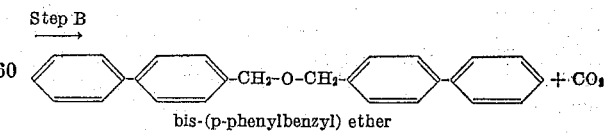

bis-(p-phenylbenzyl) ether

This ether then may further decompose as follows:

Step C
⟶

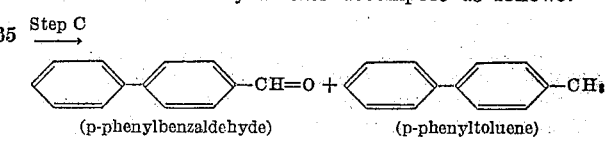

(p-phenylbenzaldehyde)    (p-phenyltoluene)

The improvement of this invention over processes which employ other ester-interchange catalysts is analogous to that described in greater detail in a copending application filed on even date herewith, Ser. No. 399,822. The improvement can be illustrated specifically by comparing the following three examples:

Example 3.—Polycarbonate employing titanium butoxide as catalyst

Ten grams of 4,4'-bis(hydroxymethyl)biphenyl-bis(ethyl carbonate) containing 0.0004 equivalent of titanium as titanium butoxide was heated in a 270° C. oil bath for fifteen minutes while dry nitrogen was bubbled through the melt. A vacuum pump was then attached, and the viscous melt heated at 270° C. at 0.5–1 mm. for an additional fifteen minutes. During this second stage the viscosity increased. There was no evidence of frothing as in the two following examples. The product was a clear, colorless melt at 270° C.; when cooled a hard, dense, white porcelain-like polymer was obtained. The threads drawn from the melt crystallized in air and were brittle.

Example 4.—Inoperative character of LiAl(OC$_2$H$_5$)$_4$ as catalyst

This experiment was run simultaneously with the one described in Example 3, but it differed in that 0.0004 equivalent of lithium aluminum, as lithium aluminum ethylate, was used for the catalyst. After five minutes of the first stage, the evolution of carbon dioxide was evidenced by the frothing of the melt. When vacuum was applied, the frothy melt rose in the reaction tube, and carbon dioxide continued to be evolved. At the end of the reaction the melt was filled with minute bubbles and when the polymer was cooled, a brittle, crumbly product was obtained.

Example 5.—Inoperative character of LiOCH$_3$ as catalyst

This experiment was run simultaneously with those described in Examples 3 and 4. The catalyst was 0.0004 equivalent of lithium in the form of lithium methylate. In less than five minutes of the first stage the reaction mixture began to froth due to the evolution of carbon dioxide. It then became cloudy and finally solidified. At the end of the second stage of the reaction the lemon yellow product was cooled. A crumbly, brittle polymer was obtained. Insoluble in 60:40 phenol:tetrachloroethane mixture at 150° C.

The inoperative character of other catalysts such as NaOCH$_3$, Mg(OC$_2$H$_5$)$_2$, etc. is analogous to that described in application Ser. No. 399,822 referred to above.

Examples of satisfactory polycarbonates are presented to further illustrate our invention:

Example 6.—Polycarbonate employing titanium hexoxide as catalyst

Two hundred grams of 4,4'-bis(hydroxymethyl-biphenyl-bis (propyl carbonate) was placed in a 500 cc. flask equipped with a ground glass neck and a side arm. Titanium hexoxide (0.2 gram) was added, and the reaction mixture was melted in a 260° C. oil bath. Nitrogen was bubbled through the reaction mixture during this stage. Dipropyl carbonate was removed by distillation. After 1.5 hours, a stirrer assembly was inserted, and the reaction mixture stirred under 0.3 mm. pressure for 3.75 hours. The resulting polymer crystallized rapidly when cooled. It was a hard, white porcelain-like product with high intrinsic viscosity.

Example 7.—Polycarbonate employing Ti(OC$_{11}$H$_{23}$)$_4$ as catalyst

Four hundred grams of 4,4'-bis(hydroxymethyl)-biphenyl-bis(phenyl carbonate) was mixed with 0.5 gram of titanium lauroxide as the catalyst. Nitrogen was bubbled through the reaction mixture for 2.5 hours at 200° C. The reaction mixture was stirred under water pump pressure for 30 minutes and then a Pressovac high vacuum pump was attached. A pressure of 0.4 mm. of Hg was obtained and stirring continued. After three hours under the vacuum pump, the reaction was stopped. The resulting polymer was a hard porcelain-like material. It melted at 255° C. and was capable of being drawn into fibers which could be oriented and heat-set.

Example 8.—Polycarbonate employing NaHTi(OC$_4$H$_9$)$_6$ as catalyst

Two hundred and fifty grams of 4,4'-bis(hydroxymethyl)-biphenyl-bis (ethyl carbonate) was mixed with 0.2 gram of sodium hydrogen titanium butoxide as the catalyst. The first stage of the reaction was run at 250° C. for two hours and ten minutes under nitrogen. The diethyl carbonate was allowed to distill. The mixture was stirred under water pump pressure for forty-five minutes and then a Pressovac pump was attached. The bath temperature was kept at 250° C. The melt viscosity increased and after 3 hours the reaction was discontinued. The reaction product was similar in appearance and properties to that from Example 7.

Example 9.—Polycarbonate employing Ti(OC$_2$H$_5$)$_4$ as catalyst

Fifty grams of 4,4'-bis(hydroxymethyl)-biphenyl-bis (ethyl carbonate) and four drops (about 0.060 g.) of titanium ethoxide were mixed. The reaction flask was similar to that described above. The reaction was run under nitrogen for one hour at 250° C. and the diethyl carbonate which formed was removed by distillation (stage I). A Pressovac mechanical vacuum pump was attached and the reaction mixture stirred for one hour and fifteen minutes at 250° C. and 0.2 mm. pressure. The resulting polymer was a dense, hard, white porcelain-like material.

Example 10.—Polycarbonate employing Ti(OC$_6$H$_{13}$)$_4$ as catalyst

This was run exactly as in the preceding example except that 0.1 gram of titanium hexoxide was used as the catalyst. The resulting polycarbonate was identical in appearance with the product from the preceding example.

Example 11.—Polycarbonate employing Ti(OC$_{11}$H$_{23}$)$_4$ as catalyst

This was exactly like the preceding examples except that 0.25 gram of titanium lauroxide was employed in the reaction mixture as the catalyst. Again the polycarbonate was similar in appearance.

Several of the preceding examples illustrate the employment of titanium alkoxides as the catalyst. This compound and many of its homologs are thick liquids. One drop weighs about 0.015 gram and contains about 0.0002 equivalent of titanium. It is sometimes advantageous to dissolve these liquids in an alcohol to facilitate handling the catalyst.

Another titanium compound which has been found to be useful is titanium tetrachloride. Titanium tetrachloride is difficult to handle because of its rapid reaction with the moisture in the air. It has, therefore, been found advantageous to employ this compound in the form of an ether complex. In preparing these complexes, the lower aliphatic ethers containing from 2 to 8 carbon atoms on either side of the central oxygen atom and the cyclic ethers such as 1,4 dioxane can be employed. The ether complexes are prepared advantageously by adding titanium tetrachloride slowly to an excess of the ether. It is advantageous to maintain the ether at ambient temperatures (20°–30° C.) or lower during this addition. Examples regarding the preparation of these ether complexes are presented below.

Example 12.—1,4-dioxane complex with TiCl$_4$

Titanium tetrachloride was added slowly to an excess of 1,4-dioxane. The yellow precipitate which formed was filtered and dried in a vacuum desiccator over P$_2$O$_5$. As such, it could be conveniently used as a catalyst.

Example 13.—Diethyl ether complex of TiCl$_4$

Titanium tetrachloride was added slowly to an excess of diethyl ether which was cooled in an acetone-Dry Ice bath. The solid which precipitated was separated and dried in vacuum desiccator over P₂O₅.

This was used as a catalyst as illustrated in Example 14 which serves to further illustrate our invention:

*Example 14.—Polycarbonate employing diethyl ether complex of TiCl₄ as catalyst*

A ten-gram sample of 4,4'-bis (hydroxymethyl)-biphenyl-bis-(ethyl carbonate) was heated under nitrogen with 0.1 gm. of the diethyl ether complex of TiCl₄ for twenty-five minutes at 250° C. The catalyst dissolved immediately and diethyl carbonate began to distill within about three minutes. After the initial twenty-five minute stage, the reaction mixture was stirred under vacum for one hour and forty-five minutes.

*Example 15.—Polycarbonate employing TiCl₄ as catalyst*

Fifty grams of 4,4'-bis-(hydroxymethyl)-biphenyl-bis (ethyl carbonate) was heated with two drops of titanium tetrachloride, under nitrogen, for one hour in an oil bath maintained at 250° C. The resulting product was then stirred under 0.2 mm. pressure for an additional 1.25 hours at 250° C. The resulting clear, viscous melt crystallized rapidly upon cooling to yield a dense, hard, white porcelain-like product.

*Example 16.—Polycarbonate employing TiBr₄ as catalyst*

The process described in Example 15 was repeated exactly except that TiBr₄ was employed as the catalyst. The polymer obtained was essentially identical to that in Example 15; it had a melting point of 255° C.

*Example 17.—Polycarbonate employing TiCl₄ as catalyst*

Ten grams of 4,4'-bis(hydroxymethyl) biphenyl-bis (ethyl carbonate) and 0.0004 equivalent of titanium, as titanium tetrachloride, were heated in an oil bath maintained at 270° C. Nitrogen was bubbled through the reaction mixture for fifteen minutes. During this first stage there was no frothing. A vacuum pump was then attached and the polymerization was continued for an additional fifteen minutes at 270° C. and 0.5–1.0 mm. pressure. During this second stage, the polymeric mass continued to gain in viscosity. There was no evidence of CO₂ formation. When cooled, a white, dense, porcelain-like product was obtained. Threads pulled from the melt crystallized rapidly in the air and were brittle.

It is believed that the preceding examples make it clearly apparent that the titanium catalysts are essential to the preparation of linear highly polymeric crystalline polycarbonates when self-condensing the bis-(carbonate) monomers of this invention. Other catalysts such as the alkaline metal and the alkaline earth metal alkoxides are strikingly inferior to the titanium compounds.

In addition to the employment of the titanium alkoxides, titanium tetrachloride and the ether complexes of titanium tetrachloride, other derivatives of titanium can also be employed in accordance with this invention, such as the bimetallic complexes and quaternary ammonium complexes described in Caldwell, application Serial No. 313,072, filed October 3, 1952, and Wellman and Caldwell, application Serial No. 313,075, filed on October 3, 1952.

The unexpected character of this invention is further emphasized by the fact that 4,4'-dihydroxybiphenyl-bis-(ethyl carbonate) cannot be satisfactorily employed in lieu of the bis-(carbonate) monomers of this invention as equivalents thereof. This is due to the fact that this monomeric starting material produces a porous, yellow-orange, unsatisfactory product which does not melt below about 300° C. It appears that considerable decomposition attends the formation of this product, especially when an attempt is made to melt it.

The polycarbonates of this invention can be prepared employing other reaction conditions in a monomer similar to that described in the preceding examples within the scope of the ranges and limits set forth hereinbefore.

The polymeric products embodying the invention can be produced either batch-wise or in continuous fashion. They can be used or admixed with other polycarbonates, other polymeric materials of different kind or with the usual polymer additives or modifiers. The products can be used in forming fibers, in extrusion or molding processes, or in forming films or sheets suitable for film supports for black-and-white or color photographic film.

The photographic films which can be produced can advantageously comprise a film support of the above-described polycarbonates upon which is deposited one or more layers of a silver halide emulsion which can contain appropriate sensitizers or other additives to suit the intended photographic use.

We claim:

1. A process for preparing a highly polymeric linear polycarbonate comprising (A) self-condensing a bis-(carbonate) monomer having the following formula:

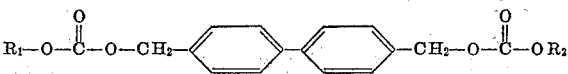

wherein R₁ and R₂ each represents a radical selected from the group consisting of lower alkyl radicals containing from 1 to 4 carbon atoms and aryl radicals of the benzene series containing from 6 to 8 carbon atoms, (B) in the presence of an ester-interchange catalyst containing titanium as an essential metallic element, which catalyst is selected from the group consisting of Ti(OR')₄
(R'R"₃N)₂ Ti(OR')₆
(R'R"₃N) HTi(OR')₆
M₂(Ti(OR')₆)
M(HTi(OR')₆)
M'(Ti(OR')₆)
M'(HTi(OR')₆)₂
Ti(OR')₄
TiX₄ and ether complexes of TiX₄ wherein the ether complexes are derived by reacting TiX₄ with an ether selected from the group consisting of aliphatic and alicyclic ethers containing from 2 to 12 carbon atoms and wherein R' represents an alkyl radical containing from 1 to 8 carbon atoms, R" represents a member selected from the group consisting of an aryl radical of the benzene series containing from 6 to 9 carbon atoms and an alkyl radical containing from 1 to 8 carbon atoms, M represents an alkali metal, M' represents an alkaline earth metal and X represents a halogen atom, (C) at an elevated temperature, (D) the condensation being conducted in an inert atmosphere and (E) the latter part of the condensation being conducted at a very low pressure.

2. A process as defined in claim 1 wherein the elevated temperature during the course of the condensation is in excess of about 200° C.

3. A process as defined in claim 2 wherein the ester-interchange catalyst is employed in an amount of from about 0.005% to about 0.2% based on the weight of the bis (carbonate) monomer.

4. A process as defined in claim 3 wherein the low pressure is less than about 15 mm. of Hg pressure.

5. A process as defined in claim 4 wherein the bis (carbonate) monomer is 4,4'-bis(hydroxymethyl)-biphenyl-bis-(ethyl carbonate).

6. A linear highly polymeric polycarbonate having a melting point above about 250° C., which is composed of the following repeating units

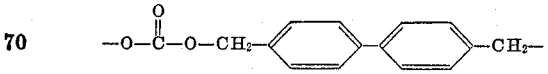

wherein the units are connected by ester linkages and one end of each polymer molecule contains an R₁-radical attached to the terminal free oxygen bond and the other end of each polymer molecule contains an

—O—CO—O—R₂ radical attached to the terminal free methylene bond, wherein R₁ and R₂ each represents a radical selected from the group consisting of lower alkyl radicals containing from 1 to 4 carbon atoms and aryl radicals of the benzene series containing from 6 to 8 carbon atoms.

7. 4,4'-bis-(β-hyroxymethyl)-biphenyl-bis-(ethyl carbonate).

8. A process as defined in claim 3 wherein the catalyst is titanium butoxide.

9. A process as defined in claim 3 wherein the catalyst is the diethyl ether complex of titanium tetrachloride.

10. A process as defined in claim 3 wherein the catalyst is titanium tetrachloride.

11. A process defined in claim 3 wherein the catalyst is the 1,4-dioxane complex of titanium tetrachloride.

12. A process as defined in claim 3 wherein the catalyst is titanium tetrabromide.

13. A compound having the following formula:

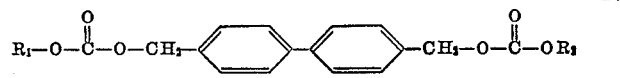

wherein R₁ and R₂ each represents a radical selected from the group consisting of lower alkyl radicals containing from 1 to 4 carbon atoms and aryl radicals of the benzene series containing from 6 to 8 carbon atoms.

14. 4,4'-bis-(hydroxymethyl)-biphenyl-bis-(propyl carbonate).

15. 4,4'-bis-(hydroxymethyl)-biphenyl-bis-(phenyl carbonate).

16. 4,4' - bis - (hydroxymethyl) - biphenyl - bis - (butyl carbonate).

17. 4,4' - bis - (hydroxymethyl) - biphenyl - bis- (pentyl carbonate).

References Cited in the file of this patent

UNITED STATES PATENTS

| | | |
|---|---|---|
| 2,210,817 | Peterson | Aug. 6, 1940 |
| 2,379,252 | Muskat et al. | June 26, 1945 |
| 2,468,975 | Held et al. | May 3, 1949 |